US010257824B2

United States Patent
Kronander et al.

(10) Patent No.: US 10,257,824 B2
(45) Date of Patent: Apr. 9, 2019

(54) TEMPLATE FRAME BASED MAC OPERATION

(71) Applicant: Telefonaktiebolaget LM Ericsson (publ), Stockholm (SE)

(72) Inventors: Jonas Kronander, Knivsta (SE); Johan Axnäs, Solna (SE); Robert Baldemair, Solna (SE); Dennis Hui, Sunnyvale, CA (US); Zhan Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 91 days.

(21) Appl. No.: 15/112,565

(22) PCT Filed: Jan. 21, 2014

(86) PCT No.: PCT/EP2014/051121
§ 371 (c)(1),
(2) Date: Jul. 19, 2016

(87) PCT Pub. No.: WO2015/110145
PCT Pub. Date: Jul. 30, 2015

(65) Prior Publication Data
US 2016/0338051 A1   Nov. 17, 2016

(51) Int. Cl.
*H04W 72/04* (2009.01)
*H04W 40/00* (2009.01)
(Continued)

(52) U.S. Cl.
CPC ....... *H04W 72/0446* (2013.01); *H04W 40/00* (2013.01); *H04W 72/1226* (2013.01); *H04W 40/12* (2013.01); *H04W 72/1278* (2013.01)

(58) Field of Classification Search
CPC .................................................. H04W 40/00
See application file for complete search history.

(56) References Cited

U.S. PATENT DOCUMENTS

| 2003/0058826 A1* | 3/2003 | Shearer, III | H04W 74/02 370/338 |
| 2008/0159208 A1* | 7/2008 | Kloker | H04W 16/14 370/329 |

(Continued)

FOREIGN PATENT DOCUMENTS

WO   2015110147 A1   7/2015

OTHER PUBLICATIONS

IEEE Standards Association, "IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 10: Mesh Networking", Sep. 10, 2011, pp. 1-372, IEEE Computer Society.

(Continued)

*Primary Examiner* — Kent K Krueger
(74) *Attorney, Agent, or Firm* — Patent Portfolio Builders, PLLC

(57) ABSTRACT

The present disclosure generally relates to the field of resource allocation. More specifically, the present disclosure relates to a technique of allocating communication resources in a wireless communication network. The wireless communication network comprises a plurality of access nodes, each of the plurality of access nodes being connected to one or more of the plurality of access nodes via one or more links to provide a plurality of routes for routing data through the wireless communication network. A method embodiment comprises the step of receiving, for one or more links (180, 182) of at least one access node (100) of the plurality of access nodes, allocation information. The allocation information indicates how available communication resources are to be allocated. The method comprises allocating, for the one or more links (180, 182) of the at least one access node (100), the available communication resources based on the received allocation information and a status of one or more data buffers of the at least one access node (100) for buffering data related to one or more of the plurality of routes.

19 Claims, 11 Drawing Sheets

(51) Int. Cl.
*H04W 72/12* (2009.01)
*H04W 40/12* (2009.01)

(56) References Cited

U.S. PATENT DOCUMENTS

| | | | |
|---|---|---|---|
| 2011/0075603 | A1 | 3/2011 | Muqattash |
| 2013/0121337 | A1* | 5/2013 | Nguyen ............... H04W 40/12 370/392 |
| 2015/0163147 | A1* | 6/2015 | Li ........................ H04L 47/18 370/236 |
| 2016/0150526 | A1* | 5/2016 | Koudouridis ..... H04W 72/0413 370/329 |
| 2016/0381604 | A1 | 12/2016 | Kronander et al. |

OTHER PUBLICATIONS

Akyildiz, I., et al., "CRAHNs: Cognitive radio ad hoc networks", Journal Article, Ad Hoc Networks 7, Jan. 14, 2009, pp. 810-836, Elsevier.

Hui, D., et al., "Joint Routing and Resource Allocation for Wireless Self-Backhaul in an Indoor Ultra-Dense Network", 2013 IEEE 24th International Symposium on Personal, Indoor and Mobile Radio Communications: Mobile and Wireless Networks, Sep. 8, 2013, pp. 3083-3088, IEEE.

Aydin, O. et al., "Deliverable D4.1 Summary on preliminary trade-off investigations and first set potential network-level solutions", Document No. ICT-317669-METIS/D4.1, Project name: Mobile and wireless communications Enablers for the Twenty-twenty Information Society (METIS), Sep. 30, 2013, pp. 1-97.

Lee. Y. L.,et al., "MCCA-Assisted Multi-Radio System using Directional Antenna", 2012 5th International Symposium on Communications Control and Signal Processing (ISCCSP), May 2, 2012, pp. 1-6, Rome, Italy.

IEEE Standards Association, "IEEE Standard for Information Technology—Telecommunications and information exchange between systems—Local and metropolitan area networks—Specific requirements; Part 11: Wireless LAN Medium Access Control (MAC) and Physical Layer (PHY) specifications", Feb. 6, 2012, pp. 1-2793, IEEE Computer Society.

Yu, X. et al., "Distributed resource reservation for real time sessions in multi-hop wireless networks", 2011 7th International Wireless Communications and Mobile Computing Conference, Jul. 4, 2011, pp. 255-260, IEEE.

Yu, X, et al., "Resource Reservation Schemes for IEEE 802.11 Based Wireless Networks a Survey", IEEE Communications Surveys & Tutorials, Nov. 29, 2012, pp. 1042-1061, vol. 15, Issue 3, IEEE.

Bernardos, C., et al., "Challenges of designing jointly the backhaul and radio access network in a cloudbased mobile network", Future Network and Mobile Summit Conference Proceedings, Jul. 3, 2013, pp. 1-10, IEEE.

\* cited by examiner

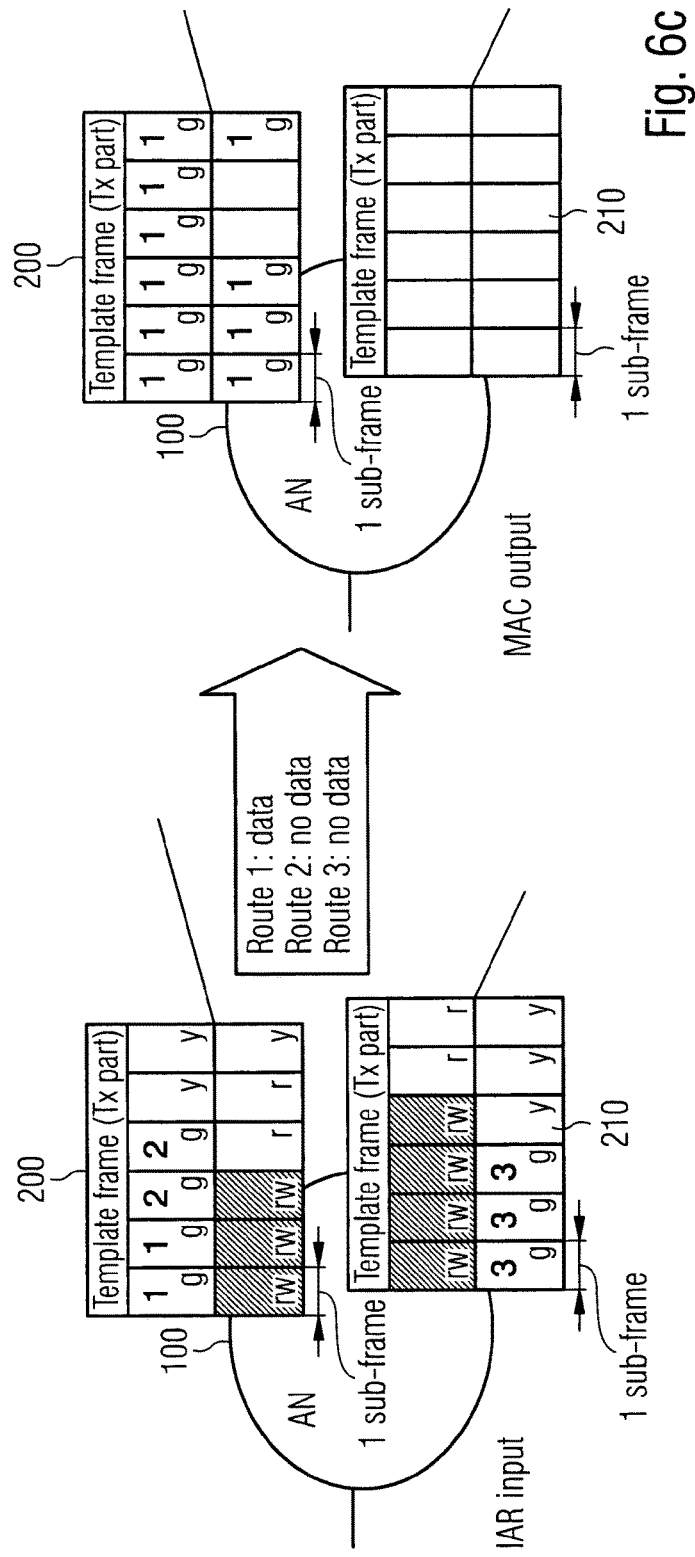

TEMPLATE FRAME BASED MAC OPERATION

TECHNICAL FIELD

The present disclosure generally relates to the field of resource allocation. More specifically, the present disclosure relates to a technique of allocating communication resources in a wireless communication network.

BACKGROUND

In mobile communications, there is an increasing demand for higher system capacity and end-user data rates. For this purpose, communication systems are densified more and more by providing a higher number of access nodes with smaller distances (from one access node to another access node) as compared with common communication systems. Still further, demands for very high system capacity and very high end-user date rates can be met by so-called Ultra-Dense Networks (UDNs). UDNs may be regarded as networks with access-node densities considerably higher than the densest cellular networks of today. Such UDNs may be set up with distances between access nodes from a few meters in indoor deployments up to around 50 m in outdoor deployment.

Data rates of the order of 10 Gigabits per second (Gbps) can be practically achieved only with a sufficiently large transmission bandwidth, significantly larger than the current maximum of 100 MHz for the Long Term Evolution (LTE) standard. UDNs may be expected to use a maximum transmission bandwidth of up to around 1 to 2 GHz. Such very wide transmission bandwidths are realistically only possible at higher frequency bands beyond 10 GHz. For example, frequencies in the lower part of the millimeter wave band up to 100 GHz may be of specific interest for UDNs.

In situations where directive beamforming is used in a UDN, informing other access nodes of upcoming use of communication resources, or spreading information on resource reservations, in a distributed fashion, is non-trivial.

In the UDN context wireless self-backhaul for a set of UDN nodes and interference aware routing solutions for routing packets through the backhaul networks have been proposed by D. Hui and J. Axnäs in the paper "Joint Routing and Resource Allocation for Wireless Self-Backhaul in an Indoor Ultra-Dense Network", PIMRC 2013. With self-backhauling, an access node serves not only its own assigned UEs in the vicinity but also its neighboring access nodes as a relaying node in order to route data towards and/or from an information aggregation node. To maximize the throughput of each route, a route selection process takes into account the mutual interference among wireless links. According the concept of the aforementioned paper, one approach is to jointly optimize route selection and radio resource allocation. For this purpose, the original network may be transformed to an expanded virtual network in which each virtual node represents a possible way of allocating radio resources to the access node. A route selected in such a virtual network jointly determines a sequence of access nodes (i.e. the real route) and the corresponding radio resources allocated to the links associated with these nodes. This and similar concepts provide a solution focusing on interference aware routing under full buffer assumptions.

The Wi-Fi family IEEE 802.11 uses most commonly a distributed coordination function (DCF) based on users contending for the resources. Each user backs off a random time interval before accessing the channels. This procedure ensures long term fairness in the access of the communication resources, but inherently relies on overhearing other nodes transmissions and hence omni-directional transmissions.

Procedures that work fine for omni-directional transmissions, e.g. Carrier Sense Multiple Access with Collision Avoidance (CSMA/CA) procedures, may be inefficient and/or not work in an UDN environment due to transmit and receive beamforming.

SUMMARY

Accordingly, there is a need for an improved technique for allocating communication resources.

According to a first aspect, a method of allocating communication resources in a wireless communication network is provided. The wireless communication network comprises a plurality of access nodes. Each of the plurality of access nodes is connected to one or more of the plurality of access nodes via one or more links to provide a plurality of routes for routing data through the wireless communication network. The method comprises the step of receiving, for one or more links of at least one access node of the plurality of access nodes, allocation information. The allocation information indicates how available communication resources are to be allocated. The method comprises allocating, for the one or more links of the at least one access node, the available communication resources based on the received allocation information and a status of one or more data buffers of the at least one access node for buffering data related to one or more of the plurality of routes.

In accordance with the method of the first aspect, the access node may receive allocation information for each of its one or more links, i.e., for each of the one or more links of the access node. In this respect, the plurality of allocation information received by the access node for its plurality of links may be referred to as set of allocation information. Using the latter wording, the number of allocation information comprised in the set of allocation information received by the at least one access node may be adapted to the number of links of the at least one access node, i.e., the number of allocation information received by the at least one access node may correspond to the number of links of the at least one access node. The allocation information for each of the one or more links may be specifically configured for the respective one of the one or more links. The allocation information for the one or more links of the access node may differ from each other. Each of the plurality of access nodes may receive such allocation information for each of its one or more links, respectively.

Even if hereinbelow it is only referred to allocation information in general or allocation information of the access node, this may be understood to mean allocation information for a link of the one or more links.

The one or more links may be referred to as wireless links, respectively. The wireless communication network may comprise or may be configured as an Ultra Dense Network (UDN). An UDN may be regarded as a network with access-node densities considerably higher than the densest cellular networks of today. Such UDNs may be set up with distances between access nodes from a few meters in indoor deployments up to around 50 m in outdoor deployment.

An access node may be configured or comprise a base station such as an eNodeB in terms of LTE, a mobile terminal such as a User Equipment (UE), a wireless access point (WAP), a station (STA) in the sense of the 802.11 standard family or the like. The plurality of access nodes may comprise one or more aggregation nodes. An aggregation node may be regarded as a node forming the connection to or entry point of the core network of the wireless communication network. An aggregation node may be regarded as a standard access node (set up to serve end users) with a wired backhaul connection. For example, the aggregation node may be an eNodeB or similar base station.

A route may be regarded as a path in the communication network from a source access node (e.g., an aggregation point of a backhaul network such as an aggregation node) to a destination access node. Each route may be formed by one or more links connecting the source access node and the destination access node via one or more intermediate access nodes. In this regard, a route may pass through two links of an access node. In the downstream direction, the route may start at a source access node, e.g., an aggregation node of the wireless communication network, then pass through one or more intermediate access nodes of the wireless communication network and may end at a destination access node, e.g., at a UE of the wireless communication network. In the upstream direction, the route may start at the UE, then pass through the one or more intermediate access nodes and may end at the aggregation node. In accordance with this example, the route may pass through two links of an intermediate access node, namely, in the downstream direction, a link in the direction to the UE, and, in the upstream direction, a link in the direction of the aggregation node.

The one or more data buffers may each be regarded as a physical memory comprised in the respective access node. Each of the plurality of access nodes may comprise such one or more data buffers. Alternatively or additionally, the term "data buffer" may be regarded as a logical buffer. The logical buffer does not necessarily have to be arranged in the respective access node, but may be located anywhere as long as it is somehow associated with the respective access node. Independent of the exact realization of the one or more data buffers, each of the one or more data buffers may relate to a respective one of the plurality of routes.

For each route, each of the one or more access nodes may comprise one or more data buffers. For example, an access node may comprise, for each link, one (single) data buffer for each route. In case the access node is configured as a source access node or a destination access node, which may have only one link, the access node may comprise one data buffer for each route for the single link. In case the access node is configured as an intermediate access node, which may have two or more links (at least one towards the UEs and one towards the aggregation node), the access node may comprise, for the link in the upstream direction, one data buffer for each route and, for each link in the downstream direction, one data buffer for each route.

Alternatively, in case multipath routing is supported, two or more links may be used for the same "multi-path route" and then one common data buffer may be used for the downstream and one upstream communication.

The allocation information may indicate, for the one or more links of the at least one access node, at least one of: which of the available communication resources is to be allocated to one or more of the plurality of routes, which of the available communication resources is to be shared with other links, which of the available communication resources is to be not allocated to one or more of the plurality of routes, and which of the available communication resources is prohibited from being allocated to one or more of the plurality of routes.

It is conceivable that the at least one access node comprises a plurality of links. If the at least one access node comprises a plurality of links, the step of receiving may comprise receiving, for each of the plurality of links of the at least one access node, allocation information, the allocation information indicating how available communication resources are to be allocated, and the step of allocating may comprise allocating, for each of the plurality of links of the at least one access node, the available communication resources based on the received allocation information and the status of one or more data buffers of the at least one access node for buffering data related to one or more the plurality of routes.

The status of the one or more data buffers of the at least one access node may indicate the amount of data related to one or more of the plurality of routes contained in the one or more data buffers. For example, the status of the one or more data buffers may indicate at least one of: an empty data buffer (there is no data in the data buffer), a large data buffer (there is more data in the data buffer than there should be/there is too much data in the data buffer), and a normal data buffer (there is a normal amount of data in the data buffer). By considering, for each of the one or more links of the at least one access node, the status of one or more data buffers related to one or more of the plurality of routes in addition to the received allocation information, the available communication resources may be efficiently allocated.

According to a first possible realization of the method according to the first aspect, if the status of one or more data buffers of the at least one access node indicates that there is data related to one or more of the plurality of routes, the step of allocating may comprise, for the one or more links of the at least one access node, allocating the available communication resources to one or more of the plurality of routes as indicated by the allocation information. For example, the status of a data buffer of the at least one access node may indicate that there is data related to a route associated with the data buffer. In this case, the available communication resources may be allocated to the route, for the link(s) concerned, as indicated by the allocation information. In other words, if there is data for a route to be transmitted on a link, the allocation follows the indication of the allocation information and allocates the available communication resources, for the respective link(s), to the route as indicated by the allocation information.

According to a second possible realization of the method according to the first aspect, if the status of one or more data buffers of the at least one access node indicates that there is no data related to one or more of the plurality of routes, the step of allocating may comprise: adjusting, for at least one of the one or more links of the at least one access node, the allocation information, and allocating, for the at least one of the one or more links of the at least one access node, the available communication resources to the one or more of the plurality of routes as indicated by the adjusted allocation information. For example, the status of a data buffer of the at least one access node may indicate that there is no data related to a route associated with the data buffer. In this case, the allocation information, for the link(s) concerned, may be adjusted and the adjusted allocation information may be used for allocating the available communication resources. For example, the adjusted allocation information may indicate that the available communication resource(s), which would have been allocated to the route, the corresponding data buffer of which indicates that it has no data, is/are not allocated to this route. In other words, if the status of one of the data buffers of the at least one access node indicates that there is no data related to the route of the plurality of routes which is associated with the data buffer, the allocation does not necessarily follow the indication of the allocation information. Rather, the allocation information may be adjusted as will be explained in more detail below and the available communication resources may be allocated as indicated by the adjusted allocation information. In this case, the adjusted allocation information may indicate that no communication resources are allocated (assigned) to the route that has no data to transmit. Instead, the adjusted allocation information may indicate that the resource(s) initially belonging to said route, that has no data, is or are reused for another route that has data to transmit.

It is important to note that the first possible realization and the second possible realization may be used in isolation from or in combination with each other for each of the one or more links of an access node. For example, for one of the one or more links, a first data buffer related to a first route may indicate that there is data to be transmitted and a second data buffer related to a second route may indicate that there is no data to be transmitted. In consequence, as the status of the first data buffer indicates that there is data related to a first route, the available communication resources may be allocated to the first route, for the link(s) concerned, as indicated by the allocation information (first possible realization). Further, as the status of the second data buffer indicates that there is no data related to the second route, the allocation information, for the link(s) concerned, may be adjusted and the available communication resources may be allocated, for the link(s) concerned, as indicated by the adjusted allocation information (second possible realization).

Independent of the exact allocation of the available communication resources, the method may further comprise at least one of: transmitting, for the one or more links of the at least one access node, data related to one or more of the plurality of routes in accordance with the allocated communication resources and receiving, for the one or more links of the at least one access node, data related to one or more of the plurality of routes in accordance with the allocated communication resources. In other words, it may be regarded as the intent of the allocation to use the allocated resources for radio transmissions and/or receptions. The at least one access node may transmit the data in accordance with the allocated communication resources as long as it does not receive new allocation information. If new allocation information is received, the at least one access node may allocate, for the one or more links of the at least one access node, the available communication resources based on the received new allocation information and the status of one or more data buffers of the at least one access node for buffering data related to one or more of the plurality of routes. Again, the at least one access node transmits the data in accordance with the (new) allocated communication resources until (again) new allocation information is received by the at least one access node for its respective one or more links. In this respect, the allocation of communication resources may be regarded as (long term) scheduling of data transmissions as long as new allocation information is not received. In other words, the template frame may be considered as the template for all frames until a newer or updated template frame is received.

According to a first variant of the second possible realization of the method according to the first aspect, the step of adjusting may comprise identifying one or more available communication resources to be allocated to one or more of the plurality of routes, for which the status of the one or more data buffers of the at least one access node indicates that there is no data, and adjusting, for at least one of the one or more links, the allocation information to indicate that at least a subset of the identified one or more available communication resources is not to be allocated to the one or more of the plurality of routes, for which the status of the one or more data buffers of the at least one access node indicates that there is no data. For sake of brevity, the one or more of the plurality of routes, for which the status of the one or more data buffers of the at least one access node indicates that there is no data, may be referred to herein as one or more dataless route(s). For example, the status of a data buffer of the at least one access node may indicate that there is no data related to a route associated with the data buffer. In this case, one or more available communication resources to be allocated to this dataless route are identified and the identified allocation information, for the link(s) concerned, may be adjusted to indicate that the identified one or more available communication resources are not to be allocated to the dataless route.

In accordance with a refinement of the first variant, the step of adjusting may further comprise adjusting the allocation information to indicate that at least a subset of the identified one or more available communication resources is to be shared by at least one of the one or more links with one or more other links. In other words, for example, the identified one or more available communication resources which are not to be allocated, for a link, to a dataless route may instead be indicated, for another link of the access node, to be shared with one or more other links of the wireless communication network.

According to a second variant of the second possible realization of the method according to the first aspect, the step of adjusting may comprise identifying one or more available communication resources to be allocated to one or more of the plurality of routes, for which the status of the one or more data buffers of the at least one access node indicates that there is no data (which may again be referred to as one or more dataless routes), and adjusting, for at least one of the one or more links, the allocation information to indicate that at least a subset of the identified one or more available communication resources is to be allocated to one or more other routes of the plurality of routes (the one or more other routes being different from the one or more dataless routes and having data to be transmitted). For example, the status of a data buffer of the at least one access node may indicate that there is no data related to a route associated with the data buffer. In this case, one or more available communication resources to be allocated to the dataless route are identified and the identified available communication resources, for the link(s) concerned, may be adjusted to indicate that the identified one or more available communication resources are to be allocated to another route, for the link(s) concerned.

In accordance with a refinement of the second variant, the step of adjusting may further comprise adjusting, for at least one of the one or more links, the allocation information to indicate that at least a subset of the identified one or more available communication resources is to be not allocated to the plurality of routes. In other words, for example, for another link, the allocation information is adjusted to indicate that the identified one or more available communication resources are to be not allocated to the plurality of routes.

The step of receiving the allocation information may comprise, for the one or more links of the at least one access node, receiving at least one template frame, the at least one template frame indicating how the available communication resources are to be allocated. For each of the one or more links of the at least one access node, one or more template frames may be received. The template frame may have the same general structure for each link, but the information contained in the template frame may at least partially be different for each link.

The at least one template frame may comprise a transmission portion (or transmission part) indicating how the available communication resources are to be allocated for data transmission and a reception portion (or reception part) indicating how the available communication resources are to be allocated for data reception.

The at least one template frame may comprise two or more sub-frames and two or more sub-bands. The two or more sub-frames (in time domain) and the two or more sub-bands (in frequency domain) may form the available communication resources. The sub-frames may comprise one or more, for example, two time slots. The sub-bands may also be referred to as frequency slots.

According to a conceivable embodiment of the method according to the first aspect, the at least one template frame may comprise at least one of a first type of template frame and a second type of template frame. The first type of template frame may indicate, for the one or more links of at least one access node, the relationship to each other of the one or more links of the at least one access node. The second type of template frame may indicate, for the one or more links of at least one access node, restrictions on the available communication resources by links of other access nodes of the plurality of access nodes. In accordance with this conceivable embodiment there may be several types of template frames for each link, one template frame for each other link in the access node, and one to indicate the restrictions that are imposed on the link from other links in the network (that the access node has no control over). The former type of template frame (first type of template frame) may be considered to indicate the relationship between the link towards and from each other link in the node. As such, the first type of template frame may also be referred to as "intra node link relationship template frame" (INR-TF). The information conveyed in this INR-TF may be used by the access node to derive potential effects of, e.g., using a communication resource, which is allocated to one link, for a different link in a different direction. The latter type of template frame (second type of template frame) may be referred to as "outer restrictions template frame" (OUTR-TF). The OUTR-TF may include restrictions on the resources in a link by other links and transmissions in the system that the access node does not have any control over. These resources may typically be resources which are prohibited from being used.

According to another conceivable embodiment, the at least one template frame may comprise a plurality of conditional template frames. Each of the plurality of conditional template frames may relate to one of a plurality of conditions of one or more links of at least a subset of the plurality of access nodes. In accordance with this conceivable embodiment, the method may further comprise the step of identifying one of the plurality of conditions which has the highest similarity with the actual condition of the one or more links of the at least a subset of the plurality of access nodes. The conditional template frame related to the identified condition may then be used by the access node, for the link(s) concerned, as the template frame indicating how the available communication resources are to be allocated. In accordance with the second conceivable embodiment there may be multiple template frames associated for each link, one for each combination of the states (conditions) of all other links in the access node or the states (conditions) of all other links in the neighborhood of the access node. Each of these template frames may be conditioned on the states (conditions) of all other links in the access node or in the neighborhood of the access node. For example, depending on the particular states (conditions) that the links in the neighborhood of an access node are in, a different resource sharing and prohibiting pattern as indicated by the corresponding conditional template frame may be allowed.

According to a second aspect, a computer program is provided. The computer program comprises program code portions for performing the steps of any one of the method aspects described herein, when the computer program is run on one or more computing devices. The computer program may be stored on a computer readable recording medium.

According to a third aspect, an access node for allocating communication resources in a wireless communication network is provided. The wireless communication network comprises a plurality of access nodes. Each of the plurality of access nodes is connected to one or more of the plurality of access nodes via one or more links to provide a plurality of routes for routing data through the wireless communication network. The access node comprises a receiving component and an allocating component. The receiving component is configured to receive, for one or more links of the access node, allocation information, the allocation information indicating how available communication resources are to be allocated. The allocating component is configured to allocate, for the one or more links of the access node, the available communication resources based on the received allocation information and a status of one or more data buffers of the access node for buffering data related to one or more of the plurality of routes. The access node according to the third aspect may be configured to perform any one of the method steps described above.

The allocating component may be controlled by the Medium Access Control (MAC) layer.

According to a fourth aspect, a communication system for allocating communication resources in a wireless communication network is provided. The wireless communication network comprises a plurality of access nodes as described herein. Each of the plurality of access nodes is connected to one or more of the plurality of access nodes via one or more links to provide a plurality of routes for routing data though the wireless communication network.

The system may be configured to perform the steps of any one of the method aspects as described herein.

In general, the steps of any one of the method aspects described herein may equally be embodied in one or more suitable components, devices or units, e.g. in suitable components of the access node and/or the communication system.

BRIEF DESCRIPTION OF THE DRAWINGS

In the following, the present disclosure will further be described with reference to exemplary embodiments illustrated in the figures, in which:

FIG. 6c schematically illustrates a third variant of the second method embodiment of FIG. 6.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, the skilled person will appreciate that the present disclosure may be practiced with allocation information different from the specific template frames discussed below to illustrate the present disclosure. Also, although the present disclosure is described with reference to Ultra-Dense Networks (UDNs), the present disclosure may be practiced in any network to which mobile or stationary users may attach. For example, the present disclosure is applicable to cellular networks such as Global System for Mobile Communications (GSM), Universal Mobile Telecommunications System (UMTS), Long Term Evolution (LTE), LTE-advanced (LTE-a) networks, or to Wireless Local Area Network (WLAN) or similar wireless networks, but also to wireline networks such as, for example, the Intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor.

Figure 1A:
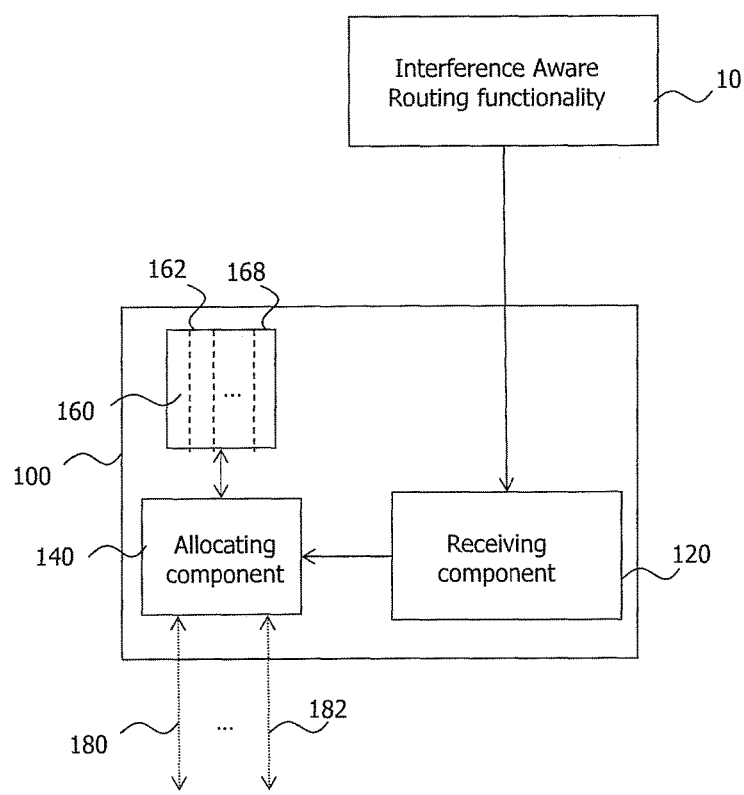
FIG. 1a is a schematic illustration of an access node according to a first device embodiment.

FIG. 1a is a schematic illustration of an access node (AN) 100 according to a first device embodiment. The AN 100 according to the first device embodiment is configured to be connected to an Interference Aware Routing (IAR) functionality 10 or a spectrum sharing functionality (not shown).

The AN 100 comprises a receiving component 120 and an allocating component 140. The allocating component 140 is controlled by the Medium Access Control (MAC) layer. Further, by way of example, the AN 100 comprises multiple data buffers 160, 162, . . . 168 to illustrate that one or more data buffers may be provided in the AN 100. It is to be noted that the data buffers 160, 162, . . . 168 do not have to be physical memories actually arranged in the AN 100. Alternatively, the data buffers 160, 162, . . . 168 may be logical buffers, which may be arranged anywhere but are associated with the AN 100. Further, two links 180, 182 are schematically illustrated in FIG. 1a via which the AN 100 is respectively connected to other ANs of a wireless communication network. For example, the AN 100 is connected to a first AN via the link 180 and to a second AN via the link 182. The two links 180, 182 are meant to illustrate that one or more links may be provided for the AN 100. The AN 100 may further comprise one or more interfaces each of which being coupled to a processor which may access the memory. The receiving component 120 may be part of the one or more interfaces, the allocating component 140 may be part of the processor and the one or more data buffers 160, 162, . . . 168 may be part of the memory, as mentioned above. A different distribution of the receiving component 120, the allocating component 140 and the one or more data buffers 160, 162, . . . 168 over the hardware components of the AN 100 may be also conceivable.

The data buffers 160, 162, . . . 168 store data which is to be transmitted over the first link 180 and/or over the second link 182 by way of scheduled transmissions. Each of the data buffers 160, 162, . . . 168 relates to one of a plurality of routes through the wireless communication network. In the following it is assumed for explanation rather than limitation that five routes, namely route 1, route 2, route 3, route 4 and route 5, are provided through the wireless communication network. In accordance therewith it is assumed for explanation rather than limitation that five data buffers 160, 162, . . . 168 are provided, wherein each of the data buffers 160, 162, . . . 168 is configured for storing the data of the corresponding route. In other words, each of the data buffers 160, 162, . . . 168 is associated with one of the multiple routes.

Figure 1B:
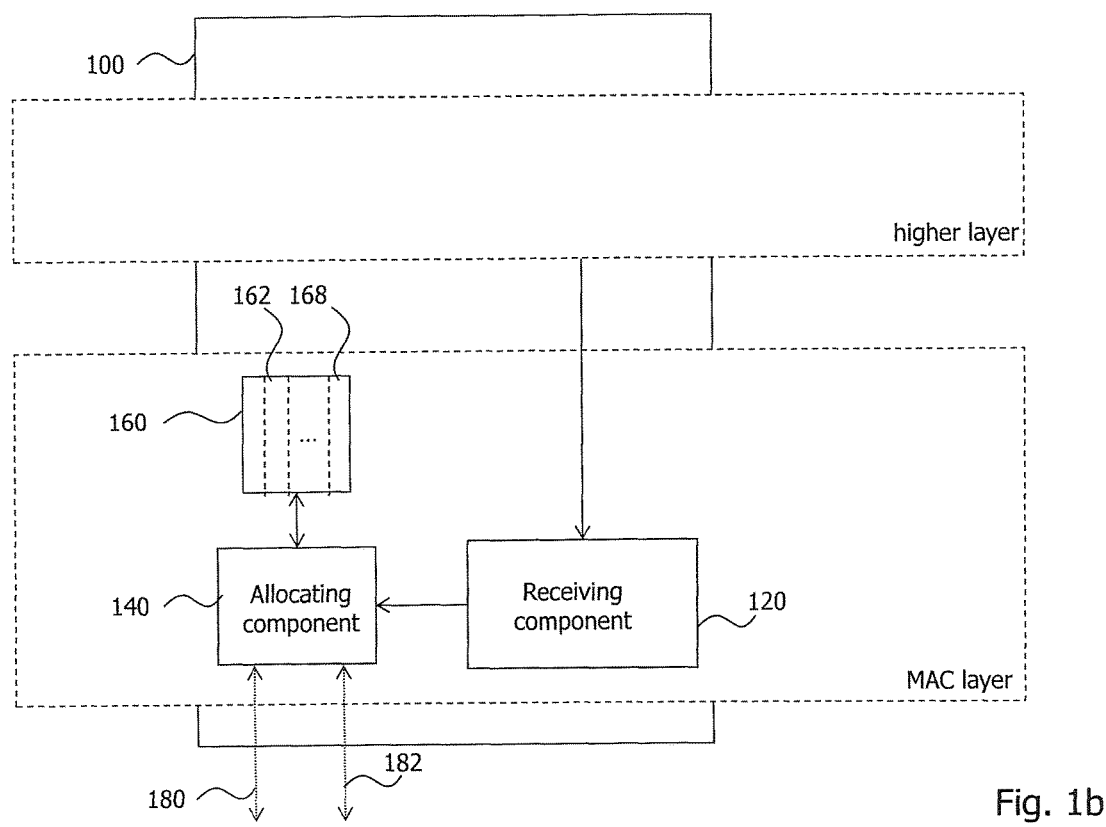
FIG. 1b is a schematic illustration of an access node according to a second device embodiment.

FIG. 1b is a schematic illustration of an AN 100 according to a second device embodiment. All components explained with respect to the AN 100 of the first device embodiment may be equally embodied in the AN 100 of the second device embodiment. Thus, the same reference signs, as used for the first device embodiment, are used for the AN 100 according to the second device embodiment and its components. The only difference between the AN 100 according to the first and second device embodiments is that the AN 100 according to the second device embodiment is not connected to the IAR functionality or spectrum sharing functionality, but the receiving component 120 of the AN 100 is configured to be connected to a higher layer component of the AN 100.

When further details are in the following explained with reference to the AN 100, these details can equally be embodied in the AN 100 according to the first device embodiment and the AN 100 according to the second device embodiment.

Independent of the exact realization of the AN 100, i.e. independent of whether the AN 100 is connected to the IAR functionality 10, the spectrum sharing functionality or the higher layer component, the AN 100 is configured to allocate communication resources in a wireless communication network. Normally, a wireless communication network comprises a plurality of ANs. At least a subset of the plurality of ANs, for example, each of the plurality of ANs, may be configured in the same way as the AN 100 and may comprise a receiving component 120, an allocating component 140 and one or more data buffers 160, 162, . . . , 168. Each of the plurality of ANs is connected to one or more of the plurality of ANs via one or more links to provide a plurality of routes for routing data through the wireless communication network. As mentioned above, with respect to the AN 100, two links 180, 182 are schematically shown to illustrate that the AN 100 and similarly each of the plurality of ANs may be connected to one or more of the plurality of ANs via one or more links.

The functionality of the AN 100 according to the first device embodiment of FIG. 1a and the AN 100 according to the second device embodiment of FIG. 1b will be explained in more detail with respect to FIG. 2 below.

Referring to the AN 100 according to the first and second device embodiments, the receiving component 120 is connected to the IAR functionality 10 or to the spectrum sharing functionality (first device embodiment) or to the higher layer component (second device embodiment). The receiving component 120 is configured to receive, for the links 180, 182 of the AN 100, allocation information (step S202). The allocation information is either received from the IAR functionality 10 or the spectrum sharing functionality (first device embodiment) or from a layer which is higher in the OSI model than the MAC layer (second device embodiment). As the MAC layer is arranged in layer 2 such higher layer may, for example, be layer 3 or layer 4. The allocation information indicates how available communication resources are to be allocated.

To explain further, the IAR functionality makes the assumption that all routes have full data buffers 160, 162, ... 168, i.e., all previously mentioned data buffers 160, 162, ... 168 are full, and solves, using methods known in the art, an optimization problem that, e.g., maximize the sum throughput in the network by assigning communication resources to the routes. This allocation is complemented by information provided by regulatory spectrum restrictions (marking some resources in a template frame, which will be explained later, as prohibited) and or restrictions imposed by a higher layer spectrum sharing functionality.

If there is no IAR functionality in the node a higher layer spectrum sharing functionality may provide a template frame, which will be explained later as one example of allocation information. The spectrum sharing functionality may negotiate, or be a proxy for negotiations, with other Ultra-Dense Networks (UDNs) for agreeing on sharing of communication resources between the UDNs. Such agreements may be reflected in such a template frame provided to the AN 100 in that some of the communication resources to be used by another UDN may be marked as prohibited.

The final allocation information, created, for example, as described above, is communicated to the allocating component 140 (in the MAC layer) in the form of a template frame, for example.

The allocating component 140 may receive or retrieve the allocation information as received by the receiving component 120. The allocating component 140 is configured to allocate, for the links 180, 182 of the AN 100, the available communication resources based on the received allocation information and the status of the data buffers 160, 162, ... 168 of the AN 100 for buffering data related to the five routes, as assumed by way of example (step S204). In other words, the allocating component 140 does not only consider the allocation information (which indicates how the available communication resources are to be allocated in the view of the IAR functionality, spectrum sharing functionality or the higher layer), but does further consider the status of the data buffers 160, 162, ... 168 of the AN 100. Each of the data buffers 160, 162, ... 168 relates to a respective one of the routes. As mentioned above, the data buffers 160, 162, ... 168 may respectively be regarded as a physical memory contained in the respective AN 100. Alternatively or additionally, the data buffers 160, 162, ... 168 may be regarded as logical buffers. The logical buffers do not necessarily have to be contained in the AN 100, but may be located anywhere as long as they are associated with the AN 100 and the routes.

If, for example, the status of the data buffer 160 for buffering data related to route 1 indicates that it contains data related to route 1 (the route which is associated with the data buffer 160) and assuming that link 180 is a hop (the whole, a part, a section or a portion) of route 1, the available communication resources are allocated, for the link 180 of the AN 100, to the respective route (route 1) as indicated by the allocation information. In other words, if there is data for route 1 in the data buffer 160 associated with route 1, the allocating component 140 follows the indication of the allocation information and allocates the available communication resources to route 1 as indicated by the allocation information to be used for transmission over link 180. Similarly, if there is data for route 5 in the associated data buffer 168, the allocating component 140 follows the indication of the allocation information and allocates the available communication resources to route 5 as indicated by the allocation information to be used for transmission of data over link 180 (assuming that link 180 is a hop of route 5 from a source AN to a destination AN in the network).

If, however, the status of the data buffer 162 for buffering data related to route 2 indicates that there is no data related to route 2 (the route which is associated with the data buffer 162) and assuming that link 182 is a hop (the whole, a part, a section or a portion) of route 2, the allocating component 140 does not simply follow the indication of the allocation information. Rather, the allocating component 140 adjusts the allocation information as will be explained in more detail below and allocates the available communication resources to route 2 for link 182 (assuming that link 182 is a hop of route 2 from a source AN to a destination AN in the network) as indicated by the adjusted allocation information. In other words, if there is no data for route 2 to be transmitted over link 182, the allocating component 140 allocates, for link 182, the available communication resources as indicated by the adjusted allocation information. The adjusted allocation information may indicate that the communication resources indicated by the allocation information to route 2 are not allocated to route 2 for example, as the data buffer 162 associated with route 2 does not contain data.

Figure 2:
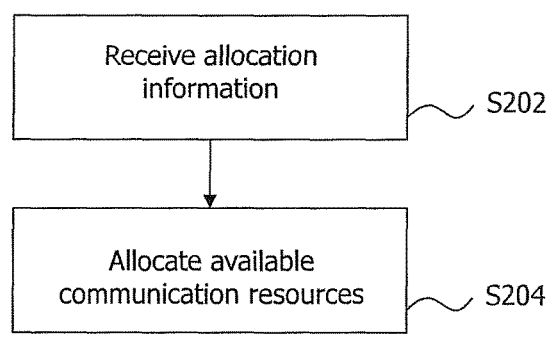
FIG. 2 is a flowchart illustrating a first method embodiment performed in the access node of FIG. 1a or 1b.

In contrast to the concept described with respect to FIGS. 1a, 1b and 2, a centralized scheduling scheme would need to first collect all information and then distribute the scheduling decision. This is an inherently slow process since the information needs to travel several hops back and forth (a hop may be regarded as another term for link in the sense of hopping from one AN to another over a link connecting the ANs).

By means of the concept set forth above, it is possible to make centralized long-term recommended routing and scheduling allocations for all links in a multi-hop UDN. This may be performed by an IAR functionality in case of full data buffers (full buffer assumption). The information on the local radio environment available in an AN is the most up to date information in the UDN. The MAC layer usually has the most updated information and may make the most informed scheduling decision. Thus, by letting, for example, the MAC layer adjust the allocation information, an improved technique for allocating communication resources may be provided.

In accordance with FIGS. 1a and 2, the IAR function provides, for each link 180, 182, a resource allocation that is based on full buffer assumption. Each AN is informed about the resource reservation for each of its links. This means that if all routes do not continuously have data, the solution provided by the IAR may then be a sub-optimal solution from a delay and/or throughput point of view. The reason for the foregoing being that the assumptions made in the optimization problem are not valid for a non-full buffer setting.

In such a context, the MAC protocol may address for resource allocation where the routes are allocated but some, or all, do not have traffic all the time.

The idea in the approach as set forth above is to adapt closely to the suggested long term allocation done by the IAR. In full buffer situations, the MAC protocol (MAC layer) follows the assignment from the IAR, and reports back the performance to the IAR so that the full buffer allocation may be refined in the next iteration. In other words, in the next iteration, the IAR may provide an updated version of the suggested long term allocation.

In situation of non-full buffers, the MAC layer uses the IAR recommendation to assign the communication resources in an efficient manner. In other words, the MAC layer uses the allocation information provided and adjusts it to become more optimal. This is possible since the MAC layer has more updated information than the IAR or higher layer as described above. For this purpose, instantaneous Channel Quality Indicator (CQI) and available Modulation and Coding Scheme (MCS) may be taken into account.

Figure 3:
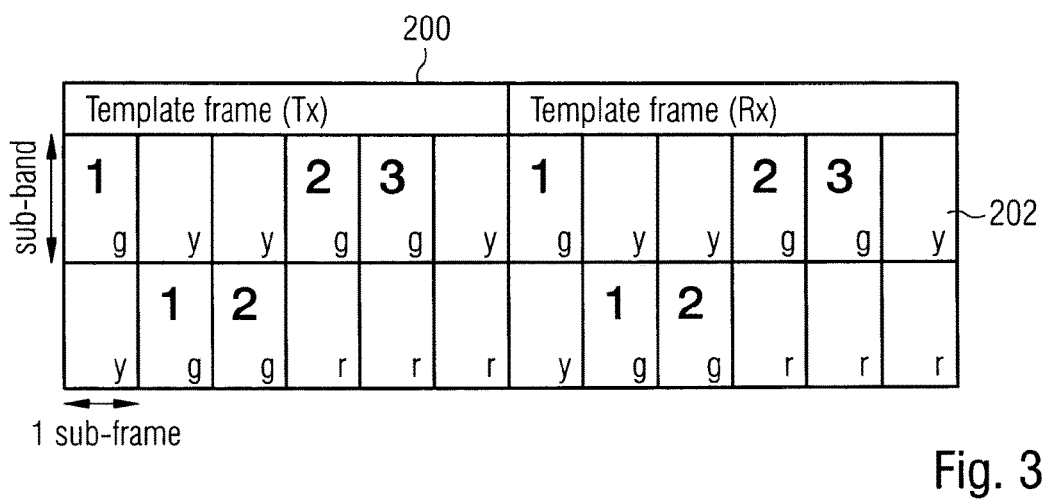
FIG. 3 schematically illustrates a template frame which can be used in the device embodiments of FIGS. 1a and 1b and the method embodiment of FIG. 2.

FIG. 3 schematically illustrates a template frame 200 as one example of how the available communication resources can be arranged and used in the device embodiments of FIGS. 1a and 1b and the method embodiment of FIG. 2. In this respect, the template frame may represent an embodiment of the allocation information. The input from the IAR or higher layer to the MAC is assumed to be one "template frame" per link. If an AN has three links, e.g., one up-stream (towards an aggregation node (AgN)—a node with wired backhaul connection) and two down-stream (in the direction of the leaf nodes—nodes further away from the fixed backhaul) in a tree structured UDN, the AN will receive three template frames, one for each link, from the IAR.

In the following, the coloring and the content of a template frame 200 will be discussed in more detail.

The template frame 200 of FIG. 3 exemplarily comprises two sub-bands to illustrate a plurality of sub-bands and twelve sub-frames to illustrate a plurality of sub-frames. The two sub-bands and the twelve sub-frames thus form twenty-four communication resources 202 which are available for allocation for each link (i.e., twenty-four available communication resources for each link). The number of sub-bands and sub-frames is merely exemplary for sake of explanation rather than limitation. Thus, the template frame 200 may have any other number of sub-frames and sub-bands. Just to give one example, the template frame may be 100 μs and may comprise 8 sub-frames in total.

The template frame 200 exemplarily comprises a transmission portion indicating how the available communication resources 202 are to be allocated for data transmission and a reception portion indicating how the available communication resources 202 are to be allocated for data reception. The data transmission portion is abbreviated as Tx portion (or Tx part) and is formed, by way of example, by the six most left sub-frames together with the two sub-bands. The data reception portion is abbreviated as Rx portion (or Rx part) and is formed, by way of example, by the six most right sub-frames together with the two sub-bands. Although by way of example the size of the data transmission portion corresponds to the size of the data reception portion, the template frame 200 is not restricted thereto, but the size of the data transmission portion may be different from the size of the data reception portion. In other words, even though the Rx and Tx part of the template frame 200 in FIG. 3 are of equal length, they may also be different in length.

In other words, one template frame contains information for both transmission (Tx) and reception (Rx) for the AN and a respective link. At the other end of the link the Tx and Rx allocations are interchanged. This is since, when the AN at one end of the link transmits, the AN at the other end of the link needs to receive, and the other way around.

In the template frame 200 of FIG. 3, an exemplary allocation of communication resources 202 is indicated. The communication resources 202 marked with a "g" are a first kind of resources, the communication resources 202 marked with a "y" are a second kind of resources and the communication resources 202 marked with an "r" are a third kind of resources. The first, second and third kind of resources are referred to in the following as green, yellow and red resources, respectively, to visualize an usage functionality thereof. The green resources are the available communication resources 202 which are to be allocated to one or more of the plurality of routes. The yellow resources are the available communication resources 202 which are to be shared with other links. The red resources are the available communication resources 202 which are prohibited from being allocated to one or more of the plurality of routes. In short, in the template frame 200 of FIG. 3, the numbers refer to routes, "g" represents a resource that if used ensures (sufficiently) interference free allocation, "y" represents shared resources, and "r" represents resources that are not to be used. In some situations there are non-allocated resources as well, which are not prohibited. These resources will be explained later. The yellow resources in the template frame 200 are shared resources that may be used for reducing the risk of buffer overflow and increase the throughput locally. The reason for using yellow resources may be that the link is in a fading dip and may not support the offered traffic using the green resources alone.

To explain further, the red resources as prohibited resources may be regarded as Atomic Scheduling Units (ASUs) that may not be used by the MAC layer for communication over a particular link. There exist two types of prohibited resources: one that may never be accessed, a red resource of the first type, and one that may be accessed under certain circumstances (note that the resource turns yellow in these cases), a red resource of the second type—the second type is the non-allocated resource which will be abbreviated as "rw" in FIGS. 6a to 6c. The reason for the existence of the first type of prohibited resources (the "r" resources) is that they may be the result of spectrum sharing negotiations or coordination between different networks or systems. They may also create unacceptable interference to another link which is allowed to use these resources unconditionally (i.e. a green resource for the other link). A red resource of the second type (the "rw" resources), i.e., a non-allocated resource, may not be accessed unless the resource is assigned as green to a link from the node that is not having any data. The MAC of the node may choose to use the green resource in a different direction, i.e., for a different link, if the corresponding resource in the new direction is a non-allocated resource (red of the second type). The resource is no longer green in the new transmit direction, i.e., it is not guaranteed by the IAR to not cause any excessive interference to other routes. Rather, the resource turns yellow, a shared resource. This is exemplified in FIG. 5 and will be explained in more detail below.

Referring to FIG. 3, by way of example, the green resources are respectively allocated or assigned to three different routes, namely route 1, route 2 and route 3. As can be seen by way of example, two green resources are respectively allocated to route 1 in the Tx portion and route 1 in the Rx portion. Likewise, two green resources are respectively allocated to route 2 in the Tx portion and route 2 in the Rx portion. Regarding route 3, one green resource is respectively allocated to route 3 in the Tx portion and route 3 in the Rx portion. Further, there are four yellow resources in the Tx portion and the Rx portion, respectively. Finally, there are three red resources of the first type in the Tx portion and the Rx portion, respectively.

Figure 4A:
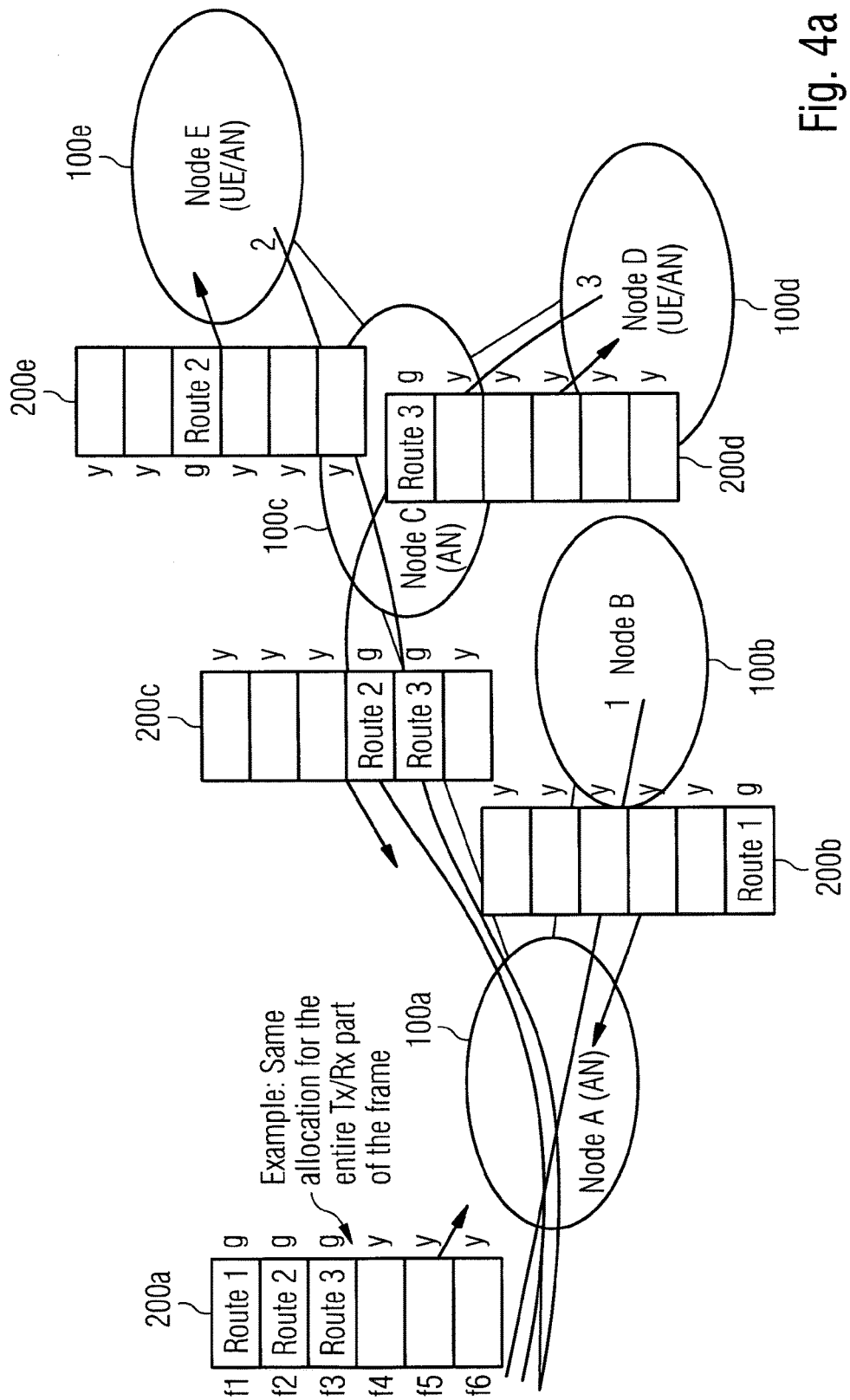
FIGS. 4a and 4b schematically illustrates an Ultra-Dense Network (UDN) in which a template frame is used for communication resource allocation.
Figure 4B:
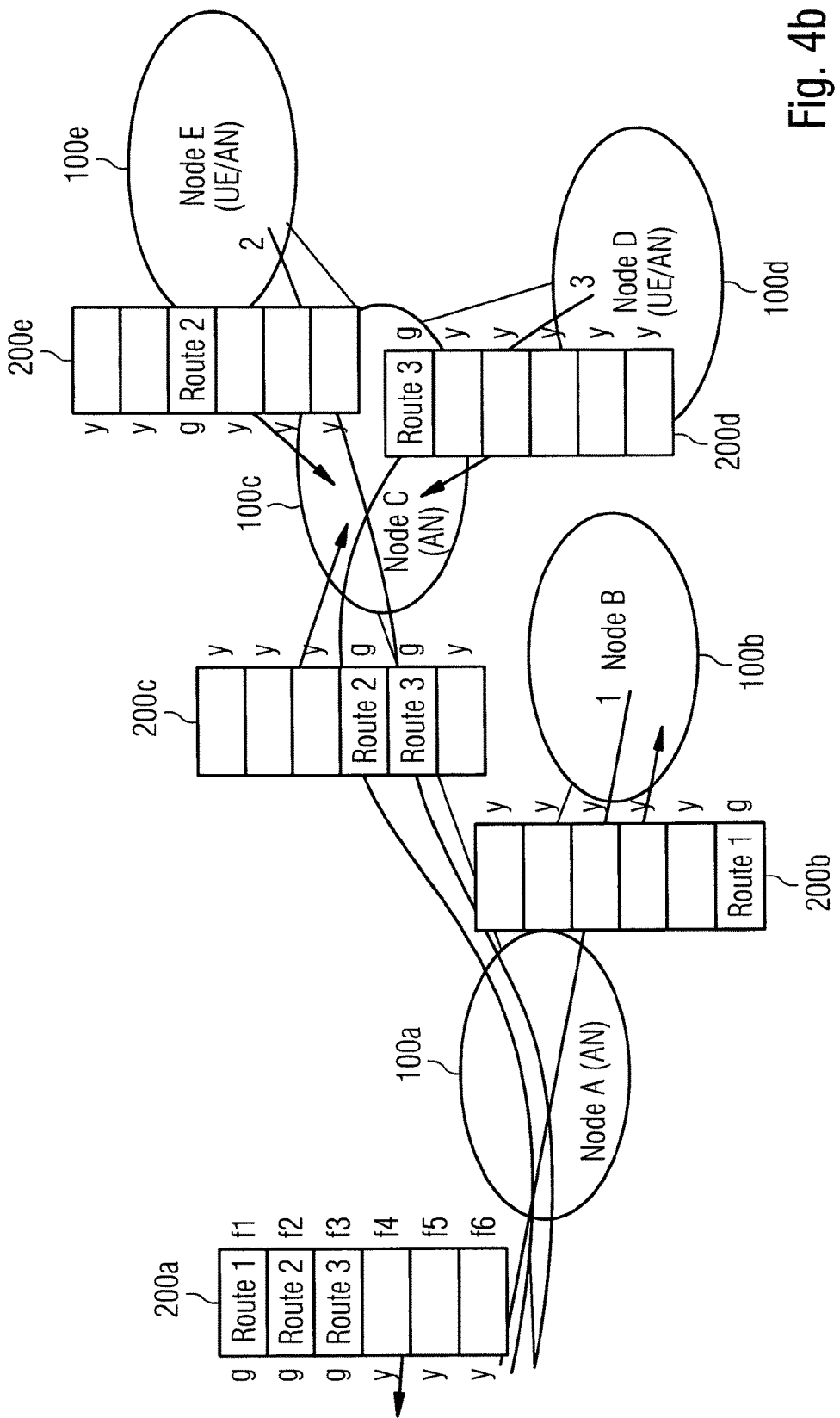

The details regarding the use of template frames are explained further with respect to FIGS. 4a and 4b.

FIGS. 4a and 4b schematically illustrate the use of the Rx and the Tx part of a template frame for a part of a UDN. Each AN 100a to 100e receives as many template frames has it comprises links. That is, AN 100a receives two template frames as it has two links, AN 100b receives one template frame as it has one link, AN 100c receives three template frames as it has three links, AN 100d receives one template frame as it has one link and AN 100e receives one template frame as it has one link. In FIG. 4a, the shown template frames represent the Rx part for ANs 100a, 100d, 100e and the Tx part for ANs 100b and 100c. In other words, for AN 100a, the Rx parts 200a, 200b of two template frames are shown, for AN 100b, the Tx part 200b of one template frame is shown, for AN 100c, the Tx parts 200c, 200d, 200e of three template frames are shown, for AN 100d, the Rx part 200d of one template frame is shown and for AN 100e, the Rx part 200e of one template frame is shown. It is to be noted that, for sake of brevity, only the first sub-frame of the Tx or Rx parts is respectively shown.

As stated above, a template frame includes resource allocations to specific routes passing over a link in both duplex directions. Each route is allocated resources for both up-stream and down-stream communication, which are indicated in the figures by the route number. In FIGS. 4a and 4b, all communication resources which are not marked by route 1, route 2 or route 3 are exemplarily regarded as yellow resources (the small "g" and "y" next to the communication resources indicates whether the resource is a green resource (marked with "g") or a yellow resource (marked with "y")). The yellow resources are not used if all data buffers have data (full buffer traffic) but may be assigned traffic in the case of non-full buffers for some routes.

As can be seen in FIG. 4a, the sub-band f1 of the Rx part 200a is allocated to route 1, the sub-band f2 of the Rx part 200a is allocated to route 2, and the sub-band f3 of the Rx part 200a is allocated to route 3. In a similar manner, one can derive the allocated communication resources of the other parts 200b to 200e.

Figure 5:
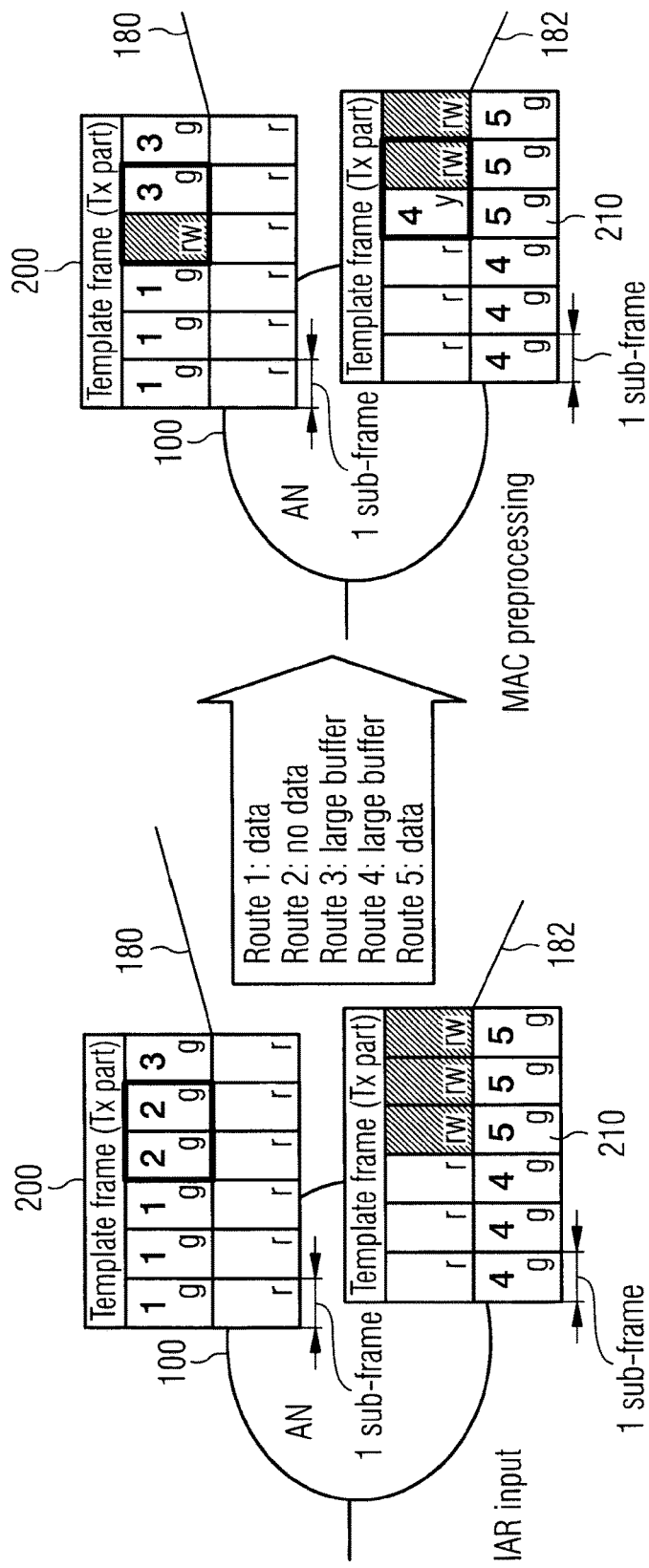
FIG. 5 schematically illustrates adjustment of a template frame by the MAC

FIG. 5 schematically illustrates the situation if one or more data buffers are empty, i.e. do not have data for the one or more corresponding routes.

In the template frame of FIG. 5, only the Tx portion of the template frame 200 is shown. For the upper link 180 of the AN 100, in the Tx portion of the template frame 200, the six sub-frames of the first (upper) sub-band are allocated as green resources for routes 1, 2 and 3. The six sub-frames of the second (lower) sub-band are red resources.

For the lower link 182 of the AN 100, in the Tx portion of the template frame 210, the six sub-frames of the first (upper) sub-band are allocated as red resources and the six sub-frames of the second (lower) sub-band are allocated as green resources for routes 4 and 5. In this way, there is no or at least minimal interference when transmitting data on the upper and lower links 180, 182. If the five data buffers associated with the five routes would have data to be transmitted, the allocating component 140 in the MAC layer would just follow the received template frames 200, 210 as recommended by the IAR functionality, spectrum sharing functionality or higher layer.

In order to understand the behavior of the MAC layer in case of one or more non-full data buffers, some further explanations are given in the following. The green resources in the template frames 200, 210 are the ones that the IAR functionality, spectrum sharing functionality or higher layer component has assigned to be safe to use, from an inter link interference perspective. These are to be used by the assigned routes if there is data in the data buffer associated with that route. Only green resources in the Tx part of the template frames 200, 210 may be used as shared (yellow) resources in other directions. This has a simple explanation: the AN 100 cannot predict the buffer status of another AN without signaling. However in the Rx part of the template frames (not shown), another AN may decide to turn a red resource of the second type (a non-allocated resource) into a yellow resource and transmit data to the first AN using that resource.

In consequence, only the green resources on a link may be used as yellow resources on a different link from the same AN. The other types may not be used in other links (directions) from the same AN. When a first AN will receive (during the Rx part of the template frame) there may be another second AN that uses a non-allocated communication resource for sending data to the first AN.

Referring to FIG. 5 again, FIG. 5 illustrates, by way of example, two different usages of green resources if the associated route has no data to be transmitted over a link. The AN 100 has an allocation to five different routes over the two considered links 180, 182. By way of example, the data buffer related to route 2 has no data to be transmitted (there is no data for route 2) and the data buffers related to routes 3 and 4 have large buffers, e.g., are full of data. As there is no data related to route 2, the green resources allocated to route 2 are unassigned from route 2 for the upper link 180 by the MAC layer of the AN 100. Instead, one of the communication resources of the template frame 200 is marked as a red resource of the second type (rw resource) and the other of the communication resources of the template frame 200 is allocated to route 3 having a large buffer. For the lower link 182, the allocating component 140 of the MAC layer allocates a previously red communication resource of the second type (rw resource) in the first row of sub-frames of the template frame 210 as a yellow resource to route 4. This resource was unallocated (as a red resource of the second type) for the upper link 180 by the MAC so that interference remains minimal.

In more detail, in the above-mentioned example, where the template frame 200 as recommended by the IAR functionality, spectrum sharing functionality or higher layer indicates that two green resources are allocated to route 2, the MAC decides to use leftmost of these two green resource for route 4 in another direction (for lower link 182), thereby turning the previously green resource in template frame 200 into a red resource of the second type (rw resource) and the previously red resource of the second type (rw resource) in template frame 210 yellow.

It is further decided by the MAC that the rightmost of the two green resources for route 2 is used by route 3 in template frame 200. This is because it is ok to use green resources assigned to a first route (route 2) for the communication purposes of a second route (route 3) in the same direction, i.e., for the same link 180, since in the next hop the data buffer for the first route (route 2) has not increased in this frame (since there has not been any data received for the first route at the AN). As such the same reuse of resources for the second route (route 3) will appear at a, potentially, later time at the next AN along the route 2 and 3. If the first route (route 2) has empty buffers at the next hop the reuse possibility appears directly and the MAC at the next AN may choose to assign the resource to the route 2 again.

As seen from the above, yellow resources, or shared resources, are generated when a green resource from one link is used for communication on a different link. Yellow resources are also resources that, from an inter system spectrum sharing perspective, are ok to use but that the IAR has not assigned a route to. This may be the case near leaf ANs in a UDN, where each link only carries one or a few routes but can support a lot more data.

Figure 6:
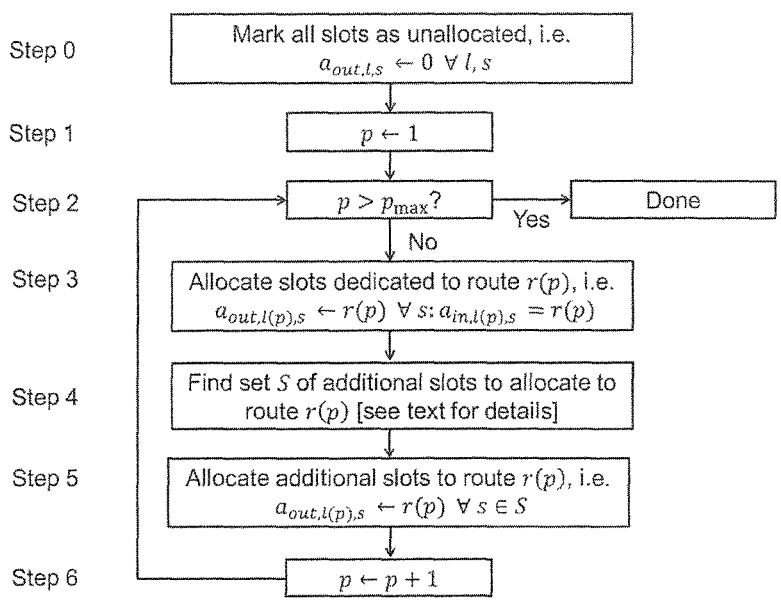
FIG. 6 is a flowchart illustrating a second method embodiment performed in the access node of FIG. 1a or 1b.

FIG. 6 is a flowchart illustrating a second method embodiment performed in the AN 100 of FIG. 1a or 1b. Several variants of the embodiment in terms of different MAC slot-allocation variants are described in the following. Although the second method embodiment is described with reference to the AN being connected to IAR functionality and thus receiving the template frame from the IAR functionality rather than from the higher layer, the second method embodiment and all of its variants can be equally applied to the architecture of FIG. 1b, according to which the template frame is proposed by the higher layer. For sake of simplicity the term communication resources is simply referred to as slots. As set forth above, regarding a template frame, the sub-frames may be regarded as comprising time slots and the sub-bands may be regarded as frequency slots.

First, some common notation is introduced: Let $p_{max}$ denote the number of packets in the packet buffer in the node in question, let these packets be indexed $p=1, 2, \ldots, p_{max}$, let $r(p)$ denote the route along which packet p is to be transferred and let $l(r)$ denote the link over which data for route r should be transmitted. For brevity, it is sometimes written $l(r(p))=l(p)$. Further, let $a_{in,l(r),s}$ denote the allocation from IAR (i.e. the template frame) on slot s of link $l(r)$, i.e. each $a_{in,l(r),s}$ is a route identifier r, let $a_{out,l(r),s}$ denote the output allocation from MAC on slot s of link $l(r)$, i.e. each $a_{out,l(r),s}$ is a route identifier r, and let $c_{in,l(r),s}$ denote the IAR color of slot s of link $l(r)$.

Let the route identifier 0 denote that a slot is unallocated, e.g. $a_{in,l(r),s}=0$ or $a_{out,l(r),s}=0$, respectively.

A slot-allocation scheme in accordance with the second method embodiment is defined according to the flowchart in FIG. 6. The variants of the second method embodiment differ only in the exact definition of step 4. It has to be noted that, although the illustrations for simplicity describe slot allocations for a packet in steps 3 to 5 of FIG. 6 as being performed irrespective of the number of slots the packet would benefit from, it is to be understood that in practice it may be better to allocate only as many slots as needed to allow for strong enough channel coding to safely transfer the packet given the noise level and interference environment that it is expected on the link.

In step 0, the IAR functionality marks all slots of the template frame as unallocated. In step 1, it is started with packet 1 and it is decided in step 2 whether packet 1 does not exist. If the decision is in the affirmative referenced as "yes" in FIG. 6a (packet 1 does not exist), the whole scheme ends. If the decision is not in the affirmative referenced as "no" in FIG. 6a (packet 1 exists), the scheme is continued in step 3 with allocating slots dedicated to route of packet 1 in the template frame by the IAR functionality. In step 4, additional slots are allocated to the route of packet 1 in the template frame by a MAC layer component. The different mechanisms for allocating additional slots are explained below with reference to three possible variants. Step 4 may be regarded as adjusting the allocation information by the MAC layer as explained above with reference to FIG. 2. In step 5, the additional slots are allocated to the route of packet 1 in the template frame by the MAC layer. Step 5 may be regarded as the allocation of communication resources in accordance with the received allocation information (in case of full data buffers) as explained above with reference to FIG. 2 or in accordance with the adjusted allocation information (in case of non-full data buffers) as explained above with reference to FIG. 2. Finally, in step 6, the packet number is increased to 2 and the steps 2 to 6 are repeated for packet 2 in the packet buffer and so on until the all packets in the packet buffer have been used ($p>p_{max}$).

Figure 6A:
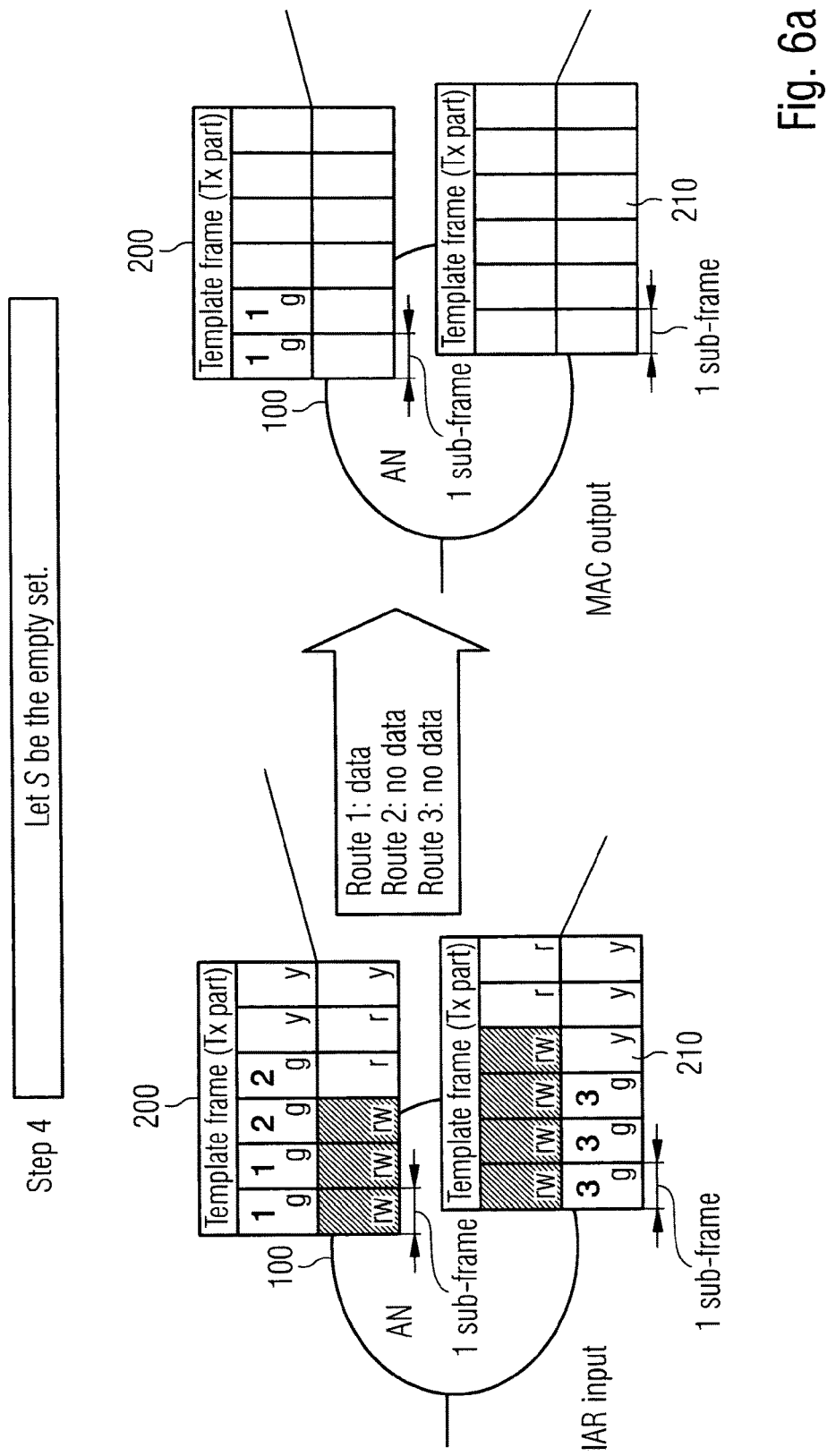
FIG. 6a schematically illustrates a first variant of the second method embodiment of FIG. 6.

FIG. 6a schematically illustrates a first variant of the second method embodiment of FIG. 6.

In this first variant, packets are scheduled only on the slots allocated to a route. More precisely, step 4 of the slot-allocation scheme in FIG. 6 is defined as shown in FIG. 6a. This means that no additional slots are to be allocated to a route in case one or more data buffers related to one or more other routes are empty. According to the example given in FIG. 6a, route 1 has data while routes 2 and 3 do not have data in their respective data buffers. According to step 4 of FIG. 6a, no additional slots are allocated to route 1. Thus, the resources for routes 2 and 3 are unallocated and not assigned to route 1.

Figure 6B:
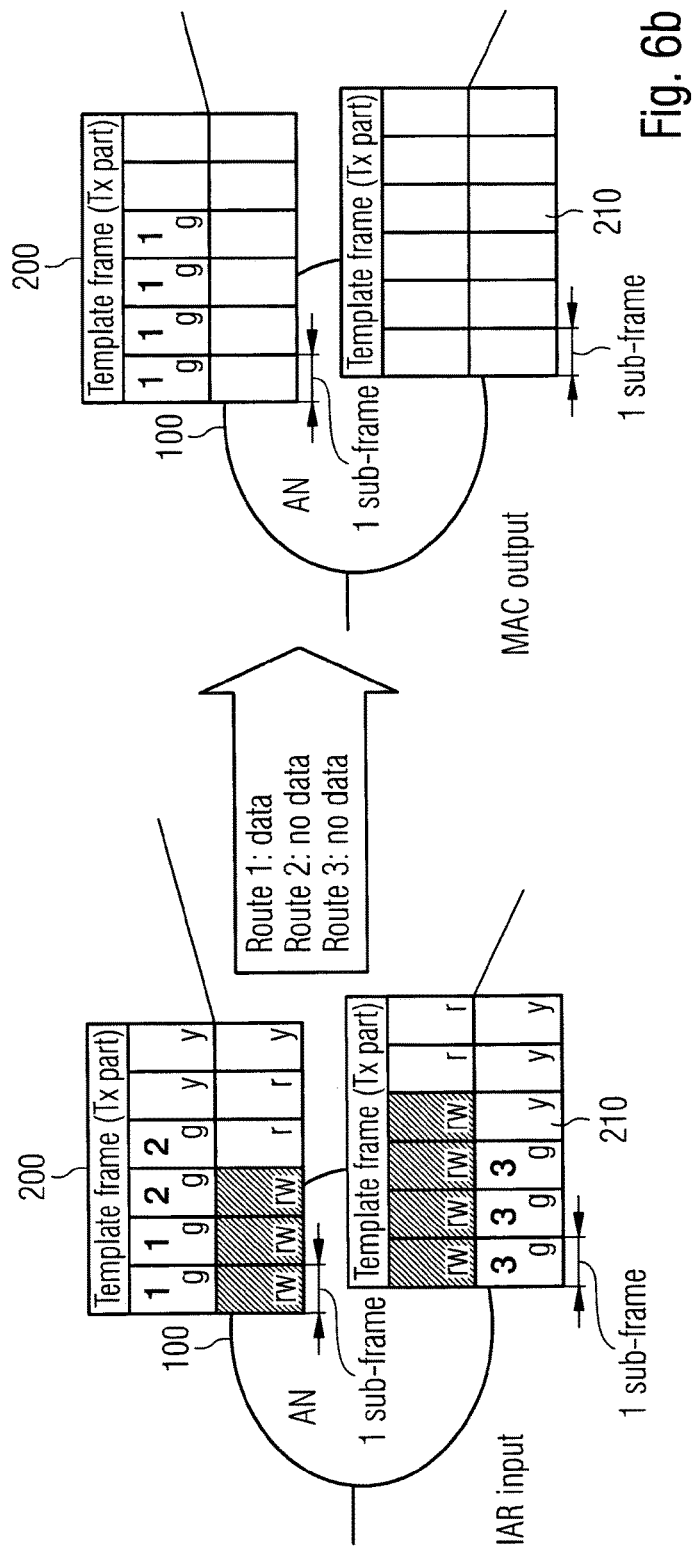
FIG. 6b schematically illustrates a second variant of the second method embodiment of FIG. 6.

FIG. 6b schematically illustrates a second variant of the second method embodiment of FIG. 6.

In this second variant, in case one or more data buffers related to one or more routes are empty, additional slots are to be allocated to another route. More precisely, in accordance with the second variant, if two or more routes share a link, and one or more of the routes do not have any packets to send, then the other routes may transmit on the slots allocated to those non-transmitting routes. The additional slots satisfying the following three conditions are to be allocated additionally by the MAC layer or protocol: (i) the slot has to be green for the link concerned, (ii) the slot is not already allocated, and (iii) the slot is not dedicated to a route of a later packet in the buffer.

Step 4 of the slot-allocation scheme in FIG. 6 is defined as in FIG. 6b. According to the example given in FIG. 6b, route 1 has data while routes 2 and 3 do not have data in their respective data buffers. According to step 4 in FIG. 6b, additional slots are allocated to route 1. More precisely, it is searched for slots which are green, not already allocated and not dedicated to a route of a later packet in the buffer. In the given example, these conditions are fulfilled for the two slots following the slots already allocated to route 1. These slots were previously allocated to route 2 by the IAR functionality. However, the MAC adjusts this allocation: these two slots are allocated to route 1 by the MAC layer.

An advantage of this scheme is that it may allow routes to use slots originally not allocated to it by IAR, without any risk of causing any extra interference in the system as compared to what the original allocation by IAR would cause.

FIG. 6c schematically illustrates a third variant of the second method embodiment of FIG. 6.

In this third variant, in case one or more data buffers related to one or more routes are empty, additional slots are to be allocated to another route. More precisely, any slot not allocated to a route that currently has packets to transmit can be freely used by any route for transmission on any link from the node. Hence even slots not allocated for transmission at all may be used for transmission. The additional slots satisfying the following three conditions are to be allocated additionally by the MAC: (i) the slot has to be not prohibited, (ii) the slot is not already allocated, and (iii) the slot is not dedicated to a route of a later packet in the buffer.

Step 4 of the slot-allocation scheme in FIG. 6 is defined as in FIG. 6c. In more detail, route 1 has data while routes 2 and 3 do not have data in their respective data buffers. According to step 4 in FIG. 6c, additional slots are allocated to route 1. More precisely, it is searched for slots which are not prohibited (not red resources), not already allocated and not dedicated to a route of a later packet in the buffer. These conditions are fulfilled for all but two slots in the template frame for the upper link. Only the red resources are not allocated to route 1. Even the "rw" resources (red resourced of the second type) are allocated to route 1 by the MAC. In consequence, for the upper link, all but two slots are allocated to route 1 by the MAC layer.

An advantage of this scheme is that at low route utilization in the system (for many routes there are often no packets to transmit), the routes that momentarily happen to have packets to transmit can utilize a large amount of the system resources.

By means of one or more of the above embodiments, the problem of how to allocate in a collision free manner the resources in a multi-hop UDN that employs centralized routing and beamforming is solved.

The invention claimed is:

1. A method, implemented by an access node, of allocating communication resources in a wireless communication network, the method comprising:
    receiving a template frame representing a grid specifying a time-frequency resource allocation of a link supporting a route between the access node and a further access node, each position in the grid specifying whether a respective time-frequency resource of the link is to be allocated to the route between the access node and the further access node; and
    allocating the time-frequency resources of the link based on the received time-frequency resource allocation of the link and a status of a data buffer of the access node associated with the route.

2. The method of claim 1, wherein the grid further specifies which of the time-frequency resources:
    is to be shared with other links between access nodes;
    is to be not allocated to the route; and/or
    is prohibited from being allocated to the route.

3. The method of claim 1, wherein the allocating is responsive to the status of the data buffer indicating that there is data to be routed via the route.

4. The method of claim 1, further comprising adjusting the received time-frequency resource allocation in response to the status indicating that there is no data to be routed via the route, wherein the allocating is in response to the adjusting.

5. The method of claim 4, wherein the adjusting comprises changing a position in the grid from specifying that a time-frequency resource is to be allocated to the route to instead specify that the time-frequency resource is to be not allocated to the route.

6. The method of claim 5, wherein the adjusting comprises changing a further position in the grid from specifying that a further time-frequency resource is to be allocated to the route to instead specify that the further time-frequency resource is to be shared by another link between access nodes.

7. The method of claim 4, wherein the adjusting comprises changing a position in the grid from specifying that a time-frequency resource is to be allocated to the route to instead specify that the time-frequency resource is to be allocated to one or more other routes between access nodes.

8. The method of claim 7, wherein the adjusting comprises changing a further position in the grid from specifying that a further time-frequency resource is to be allocated to the route to instead specify that the further time-frequency resource is to be not allocated to the route.

9. The method of claim 1, wherein the method further comprises:
    receiving, for each of a plurality of links of the access node, allocation information indicating how available communication resources are to be allocated; and
    allocating, for each of the plurality of links of the access node, the available communication resources based on the received allocation information and the status of data buffers of the access node for buffering data related to routes using at least one of the links.

10. The method of claim 1, wherein the template frame comprises:
    a transmission portion indicating how available communication resources are to be allocated for data transmission; and
    a reception portion indicating how the available communication resources are to be allocated for data reception.

11. The method of claim 1, wherein the grid further specifies two or more sub-frames and two or more sub-bands of the time-frequency resource allocation.

12. The method claim 1, further comprising receiving a plurality of template frames, wherein:
    at least one of the plurality of template frames indicates, for a plurality of links between access nodes, a relationship of the access nodes to each other; and
    at least one other of the template frames of the plurality of template frames indicates, for the plurality of links between the access nodes, restrictions on the time-frequency resource allocation by links of other access nodes of the plurality of access nodes.

13. The method of claim 1, further comprising:
    receiving a plurality of conditional template frames, each of the plurality of conditional template frames relating to one of a plurality of conditions of one or more links between access nodes; and
    identifying one of the plurality of conditions which has the highest similarity with an actual condition of the one or more links between the access nodes,
    wherein the conditional template frame related to the identified condition is used as the template frame.

14. The method of claim 1, further comprising transmitting and/or receiving data related to route in accordance with the time-frequency resource allocation.

15. The method of claim 1, wherein the wireless communication network comprises or is configured as an Ultra-Dense Network.

16. A non-transitory computer readable medium storing a computer program product for allocating communication resources in a wireless communication network, the computer program product comprising software instructions which, when run on one or more processors of an access node, cause the access node to:
    receive a template frame representing a grid specifying a time-frequency resource allocation of a link supporting a route between the access node and a further access node, each position in the grid specifying whether a respective time-frequency resource of the link is to be allocated to the route between the access node and the further access node; and allocate the time-frequency resources of the link based on the received time-frequency resource allocation of the link and a status of a data buffer of the access node associated with the route.

17. An access node for allocating communication resources in a wireless communication network, the access node comprising:

a processor;

memory containing instructions executable by the processor whereby the access node is operative to:

receive a template frame representing a grid specifying a time-frequency resource allocation of a link supporting a route between the access node and a further access node, each position in the grid specifying whether a respective time-frequency resource of the link is to be allocated to the route between the access node and the further access node; and allocate the time-frequency resources of the link based on the received time-frequency resource allocation of the link and a status of a data buffer of the access node associated with the route.

18. The access node of claim 17, wherein the allocation is controlled by a Medium Access Control (MAC) layer.

19. A wireless communication network comprising:

a plurality of access nodes, each access node of the plurality of access nodes being connected to one or more access nodes of the plurality of access nodes via one or more links to provide a plurality of routes for routing data through the wireless communication network;

wherein the plurality of access nodes comprises a first access node and a second access node, the first access node comprising:

a processor;

memory containing instructions executable by the processor whereby the first access node is operative to:

receive a template frame representing a grid specifying a time-frequency resource allocation of a link supporting a route between the first access node and the second access node, each position in the grid specifying whether a respective time-frequency resource of the link is to be allocated to the route between the first access node and the second access node; and allocate the time-frequency resources of the link based on the received time-frequency resource information and a status of a data buffer of the first access node associated with the route.

* * * * *